(12) United States Patent
Kinner et al.

(10) Patent No.: US 10,746,353 B2
(45) Date of Patent: Aug. 18, 2020

(54) REMOTELY CONTROLLED MATERIAL DELIVERY SYSTEM

(71) Applicant: First Power Group, LLC, Twinsburg, OH (US)

(72) Inventors: Robert H. Kinner, Twinsburg, OH (US); John W. Harley, Peninsula, OH (US)

(73) Assignee: First Power Group, LLC, Twinsburg, OH (US)

( * ) Notice: Subject to any disclaimer, the term of this patent is extended or adjusted under 35 U.S.C. 154(b) by 363 days.

(21) Appl. No.: 15/138,544

(22) Filed: Apr. 26, 2016

(65) Prior Publication Data

US 2017/0030516 A1    Feb. 2, 2017

Related U.S. Application Data

(60) Provisional application No. 62/197,400, filed on Jul. 27, 2015.

(51) Int. Cl.
*H04N 5/232* (2006.01)
*F16N 7/32* (2006.01)
*F16N 7/34* (2006.01)
*B05B 15/62* (2018.01)
*B05B 12/02* (2006.01)
*B05B 9/03* (2006.01)
(Continued)

(52) U.S. Cl.
CPC .............. *F16N 7/32* (2013.01); *B05B 12/02* (2013.01); *B05B 15/62* (2018.02); *B65D 83/203* (2013.01); *B65D 83/207* (2013.01); *F16N 7/34* (2013.01); *H02B 3/00* (2013.01); *H04N 5/23206* (2013.01); *B05B 9/01* (2013.01)

(58) Field of Classification Search
CPC ........ B05B 15/62; B05B 15/628; B05B 15/02; B05B 15/061; B05B 9/01; F16N 7/32; F16N 7/34
USPC ................. 239/289, 67, 532, 525, 304–308; 222/182, 183, 174, 402.1–402.25
See application file for complete search history.

(56) References Cited

U.S. PATENT DOCUMENTS 3,229,859 A * 1/1966 Conroy ................ B65D 83/203
222/174
3,485,206 A * 12/1969 Smrt ..................... E01C 23/227
118/305
(Continued)

OTHER PUBLICATIONS

Hastings Catalog; p. 211, 2015.
(Continued)

*Primary Examiner* — Joseph A Greenlund
(74) *Attorney, Agent, or Firm* — Emerson, Thomson & Bennett, LLC; Roger D. Emerson

(57) ABSTRACT

A remotely controlled material delivery system having at least one canister, for containing a material; a nozzle; a manifold to direct movement of the material from the canister to the nozzle; a valve mechanism to control the flow of material; a signal receiver; a power source; a mounting adapter; and a remote controller operable to generate a signal wherein the signal is transmitted from the remote controller to the signal receiver, wherein the receiver can open and close the valve in response to the remotely generated signal and wherein the signal can be transmitted through a wired connection, an optical connection, or wirelessly from the remote controller to the signal receiver.

13 Claims, 3 Drawing Sheets

(51) Int. Cl.
  *B65D 83/20* (2006.01)
  *H02B 3/00* (2006.01)
  *B05B 9/01* (2006.01)

(56) References Cited

U.S. PATENT DOCUMENTS

| | | | | |
|---|---|---|---|---|
| 3,716,195 A * | 2/1973 | Silva | B65D 83/203 | 239/375 |
| 3,856,209 A * | 12/1974 | Hickson | B65D 83/203 | 239/532 |
| 3,952,923 A * | 4/1976 | Tison | B65D 83/203 | 222/174 |
| 4,023,711 A * | 5/1977 | Sena | B05B 15/628 | 222/174 |
| 4,789,084 A * | 12/1988 | Yoshitomi | B05C 17/10 | 222/174 |
| 4,969,579 A * | 11/1990 | Behar | B65D 83/682 | 222/136 |
| 5,518,148 A * | 5/1996 | Smrt | B65D 83/202 | 222/174 |
| 5,634,571 A * | 6/1997 | Cataneo | B05B 7/32 | 222/134 |
| 5,868,103 A | 2/1999 | Boyd | | |
| 6,450,423 B1 * | 9/2002 | Gurule | B65D 83/203 | 222/174 |
| 6,551,001 B2 * | 4/2003 | Aberegg | A01M 7/00 | 222/608 |
| 6,889,920 B2 * | 5/2005 | Nance | B08B 9/0433 | 239/587.1 |
| 6,948,637 B1 * | 9/2005 | Jacobs | B65D 83/203 | 222/174 |
| 7,021,499 B2 * | 4/2006 | Hansen | A47L 13/00 | 222/135 |
| 7,040,510 B1 * | 5/2006 | Hester | B05B 11/3056 | 222/174 |
| 7,083,125 B2 * | 8/2006 | Westphal | B65D 83/203 | 239/525 |
| 7,252,210 B1 * | 8/2007 | Schultz | B65D 83/203 | 222/174 |
| 7,299,950 B2 * | 11/2007 | Laveault | A01M 21/043 | 222/153.11 |
| 7,717,300 B1 * | 5/2010 | Yarrusso, Jr. | A01M 1/2038 | 222/174 |
| 7,798,366 B2 * | 9/2010 | Hoshino | B65D 83/62 | 222/105 |
| 7,967,220 B2 * | 6/2011 | Hansen | B65D 83/202 | 239/304 |
| 8,444,020 B1 * | 5/2013 | Kenny | B65D 83/203 | 222/162 |
| 8,500,039 B2 * | 8/2013 | Allen, Jr. | A01M 7/0046 | 239/67 |
| 8,596,498 B2 * | 12/2013 | Werner | B05B 11/3083 | 222/136 |
| 8,757,514 B1 * | 6/2014 | Perello | B05B 15/60 | 239/280.5 |
| 9,421,568 B1 * | 8/2016 | Reith | B05B 15/62 | |
| 9,579,676 B1 * | 2/2017 | Burrowes | A61L 9/14 | |
| 10,059,504 B2 * | 8/2018 | Olsson | B65D 83/36 | |
| 10,315,834 B2 * | 6/2019 | Carrette | B65D 83/203 | |
| 2005/0199653 A1 * | 9/2005 | Warner | B65D 83/203 | 222/174 |
| 2006/0071036 A1 * | 4/2006 | Gervais | B65D 83/203 | 222/402.15 |
| 2006/0118656 A1 * | 6/2006 | Griffith | B08B 1/00 | 239/280 |
| 2007/0014108 A1 * | 1/2007 | Uke | B25F 1/00 | 362/191 |
| 2008/0006727 A1 * | 1/2008 | Roh | B08B 3/026 | 239/754 |
| 2008/0099588 A1 * | 5/2008 | Zinski | B08B 3/028 | 239/722 |
| 2009/0008479 A1 * | 1/2009 | Domizio | B65D 83/303 | 239/532 |
| 2009/0308946 A1 * | 12/2009 | Dube | B65D 83/207 | 239/9 |
| 2010/0108779 A1 * | 5/2010 | Filsouf | B05B 11/0054 | 239/61 |
| 2010/0185322 A1 * | 7/2010 | Bylsma | B01F 13/1063 | 700/239 |
| 2010/0326470 A1 * | 12/2010 | Seippel | B08B 3/026 | 134/14 |
| 2011/0031334 A1 * | 2/2011 | Merritt | F21V 33/0084 | 239/590 |
| 2011/0072956 A1 * | 3/2011 | Wall | F42D 1/14 | 89/1.11 |
| 2013/0200108 A1 * | 8/2013 | Di Bono | B65D 83/203 | 222/174 |
| 2015/0344136 A1 * | 12/2015 | Dahlstrom | B64C 39/024 | 701/3 |
| 2016/0058262 A1 * | 3/2016 | Charlton | A47L 13/22 | 401/138 |
| 2016/0082460 A1 * | 3/2016 | McMaster | B05B 12/122 | 701/2 |
| 2016/0344170 A1 * | 11/2016 | Tamm | H02G 1/005 | |
| 2017/0030516 A1 * | 2/2017 | Kinner | F16N 7/34 | |

OTHER PUBLICATIONS

Petsafe Remote Spray Trainer Operating and Training Guide; Radio Systems Corporation, 2007.
Nye Lubricants; Lubenotes: Design Engineer's Guide to Selecting Lubricants; 2013.

* cited by examiner

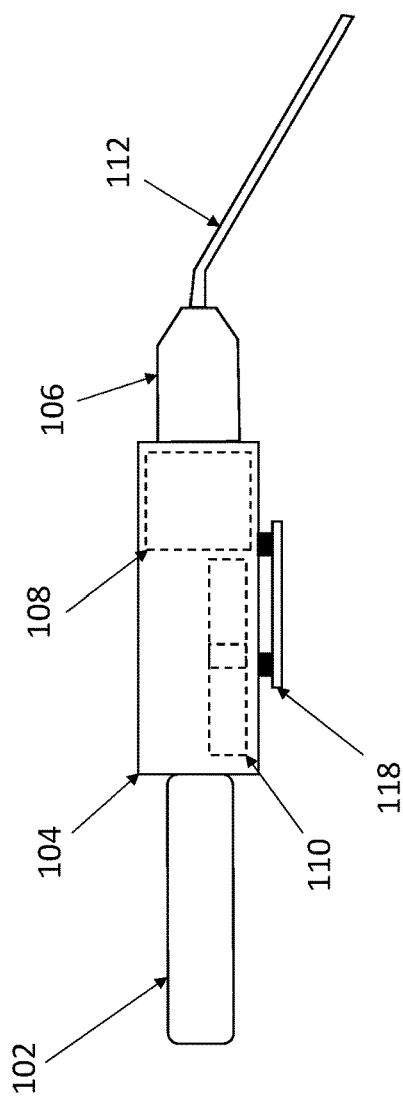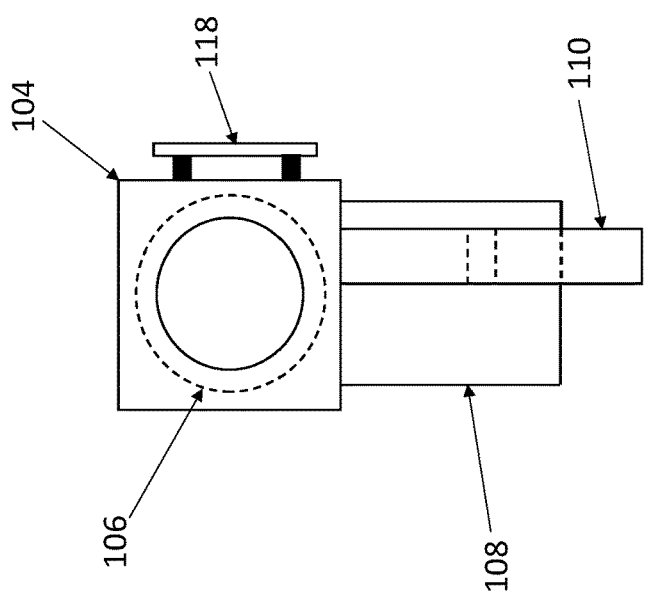

REMOTELY CONTROLLED MATERIAL DELIVERY SYSTEM

TECHNICAL FIELD

The present invention relates to an apparatus for remotely applying a fluid material. More particularly, the present invention is directed at a powered valve apparatus that couples an extension device with a manifold containing pressurized material and a remotely controllable valve.

BACKGROUND

Electric switchgear that controls or switches electric power is typically mounted in hard to reach places, e.g. on utility poles and substations. This equipment requires periodic maintenance, in particular application of penetrating oils, cleaners, and lubricants to keep it operable. In many cases, these devices require lubrication while they are powered on, where the operating voltages can reach into the tens or hundreds of thousands of volts. Thus it can be quite hazardous in terms of electrical shock to the personnel conducting the maintenance. A current lubrication solution typically involves a hand-held aerosol spray can, or an apparatus that can hold and disperse the contents of an aerosol spray can. This has disadvantages in that the user performing the maintenance may need to get in potentially dangerous close proximity to the live circuit, and also limits the application to whatever type of lubricant is available in an aerosol can. Another known solution involves attaching an aerosol spray can to the end of an extension, such as a pole or a "hot-stick" with a string or rope running down from the can to the operator. This device requires two hands to operate, with one holding the extension and another pulling the string or rope to activate the aerosol can. This can be physically awkward for the operator. If the operator pulls too hard on the rope, it may dislodge the can, possibly causing personal injury, or an electrical fault on the electric device, and at a minimum requiring the operator to re-attach the can. Additionally, the rope does not provide as high a degree of insulation as the hot stick, so in a high voltage environment, this usage could possibly cause electric shock to the operator by providing an arc path. This method is also prone to inaccurate dispersion of the lubricant, which is undesirable.

What is needed is an apparatus that provides safety for the maintenance personnel, accurate placement of the lubricant, and the flexibility of using different types of lubricants or other materials that may or may not be available in an aerosol can.

SUMMARY

Provided is a remotely controlled material delivery system having at least one canister, for containing the material; a nozzle; a manifold to direct movement of the material from the canister to the nozzle; a valve mechanism to control the flow of material; a signal receiver; a power source; a mounting adapter; and a remote controller operable to generate a signal wherein the signal is transmitted from the remote controller to the signal receiver, wherein the receiver can open and close the valve in response to the remotely generated signal and wherein the signal can be transmitted through a wired connection, an optical connection, or wirelessly from the remote controller to the signal receiver.

DESCRIPTION OF THE DRAWINGS

FIG. 1A is an alternate perspective view of the system;

FIG. 1B is a second alternate perspective view of the system;

DETAILED DESCRIPTION

Figure 1:
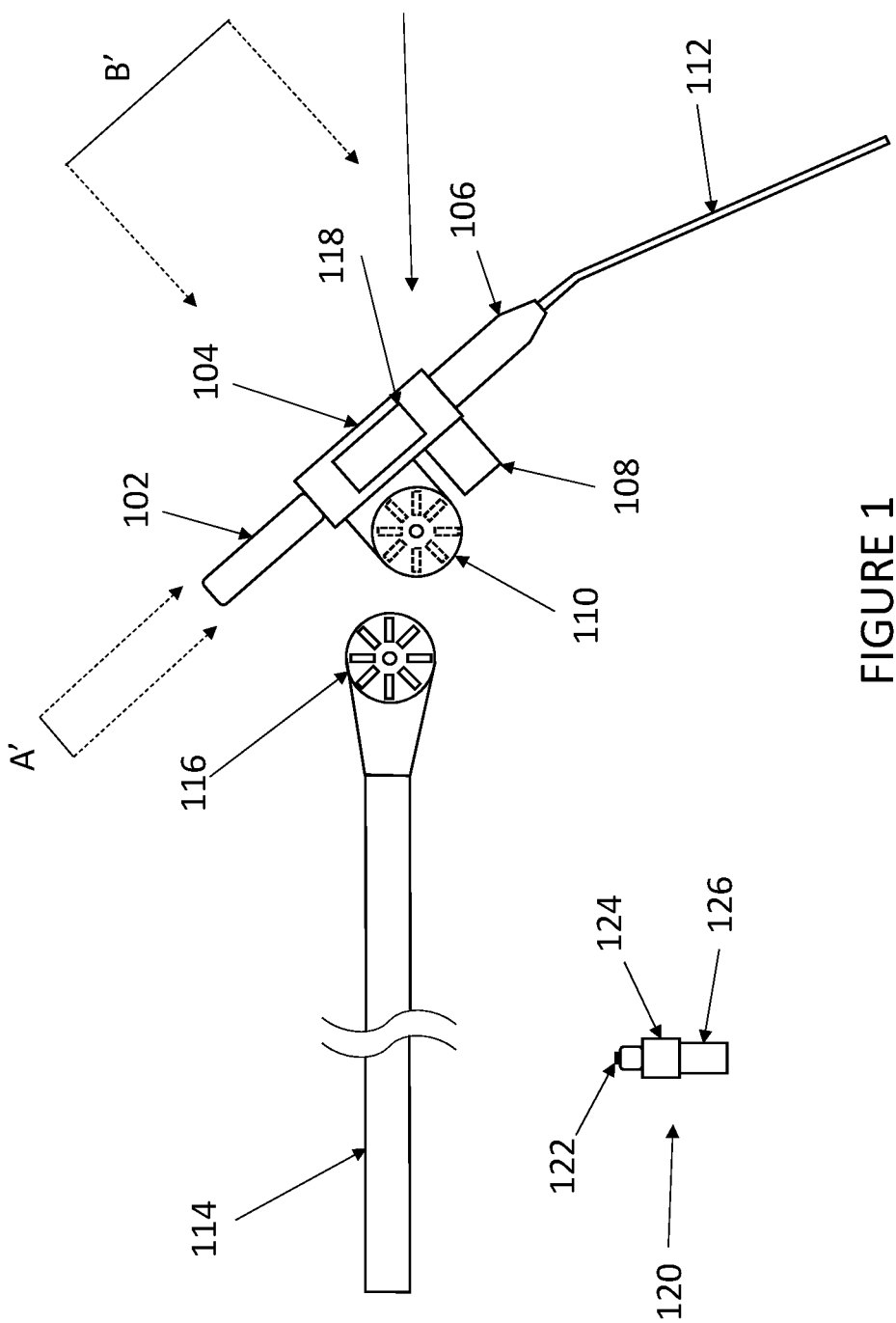
FIG. 1 is an embodiment of a remotely controlled material delivery system, including a remote controller.

With reference to FIG. 1, an embodiment of a material delivery system 100 is shown wherein a manifold 104 can be connected at a first attachment point to a canister 102 which can contain a fluid material. The manifold 104 can be connected at a second attachment point to a valve mechanism 106, which can in turn be attached to a nozzle 112. The manifold 104 can have a mounting adapter 110 that can connect to an adapter 116 which can be further connected to a hot stick 114. The material delivery system 100 can include a power source 108. The material delivery system 100 can also include a signal receiver 118. When the signal receiver 118 receives an appropriate signal, the receiver 118 can activate the valve 106 to open the valve 106 thereby releasing the contents of the canister 102 via the manifold 104.

With continued reference to FIG. 1, according to this embodiment, the mounting adapter 110 can be attached to a similarly shaped adapter 116 that can be located at the working end of a hot stick 114 or other type of extension or device that provides access to locations that are normally out of physical reach. A hot stick is an electrically insulated pole, which enables a user to safely manipulate electrical equipment and circuitry while it is powered on, and avoid electrical shock. It is typically constructed of fiberglass, and is commonly used by electric utility personnel for various functions such as maintenance and operating switches. It is typically at least eight feet long and can have a standard adapter, sometimes referred to as hot stick universal adapter that can be used with a variety of tools. The mounting adapter 110 can also be configured to accommodate other types of extensions or poles, such as broom handles, telescoping extensions, and the like. Additionally, the mounting adapter 110 can be configured such that it can be attached to a flying or ground-based remotely controlled drone such that the drone can be used instead of a manual extension, and the material can be applied to extremely inaccessible locations. This could also be extremely useful in cases where the material needs to be applied in extremely hazardous areas. The mounting adapter 110 can also be configured to be attached to a mobile type of installation, such as on a vehicle, or a static type of installation such a tripod, utility pole, or other structure. According to one embodiment, the mounting adapter 110 can be configured to attach to a linewalker.

With continued reference to FIG. 1, according to this embodiment, when the canister 102 is attached to manifold 104, the manifold 104 can be filled with the material from the canister 102. The material can remain in the manifold 104 until the valve 106 is opened, thereby allowing the material to then flow from the manifold 104 through the valve 106 and into the nozzle 112. When the valve 106 closes again, the material can remain in the manifold 104.

With continued reference to FIG. 1, according to this embodiment, when the signal receiver 118 receives an appropriate signal, it energizes the valve 106 using electric power from power source 108. The power source 108 can be a standard or rechargeable battery, or solar panel, or other type of power source, and can be connected mechanically to the system via a bracket to one of the other components, or it can be located in a housing or enclosure. It can be connected electrically to the system via a standard electrical battery terminal, or by soldering, or the like. The appropriate signal may take the form of any type or format of electromagnetic radiation (e.g. audio, supersonic, ultrasonic, infrared, RF, Wi-Fi, Zigbee, Blue-Tooth, etc.). Alternatively, the signal can be any type of acoustic or ultrasonic signal. The receiving of the signal can cause the valve 106 to open, which releases the material that is contained in manifold 104, so that it can travel through the nozzle 112 and be applied to the target in need of application of the material. The material can be initially located in canister 102, and can be under pressure so that when the valve 106 opens, it travels first into the manifold 104, and then into the nozzle 112. The canister 102 can be of a refillable type, or of a single-use type such as a spray aerosol can.

With further reference to FIG. 1, the canister 102 can be attached to the manifold 104 either via a threaded screw arrangement, or by other mechanical means. The material can either be under pressure, e.g. as in an aerosol can, or the canister 102 can act as a reservoir that is not under pressure. The attachment of the canister 102 can be configured to accommodate a standard aerosol can, which can be clamped on or otherwise attached so that the spray nozzle can be depressed, and the material in the can is then dispersed into the manifold 104, and can be held there until valve 106 is opened. The attachment of the canister 102 can also accommodate other type pressurized cans which require the top to be pierced with a hollow needle. The attachment of the canister 102 can also accommodate a configuration wherein a standard aerosol can has the spray nozzle removed, and a tube is inserted into the top of the aerosol can as it is clamped on or otherwise attached. In some cases, the material can move from the canister 102 to the manifold 104 through the valve 106 via gravity. In some cases, the material can be propelled by pressure via other means, such as compressed air. The canister 102 is shown as being mounted on the manifold 104 on the side opposite from the valve 106, but it could be located on any side of the manifold 104.

With further reference to FIG. 1, the signal receiver 118 can typically be a printed circuit board with one or more integrated circuits, and also some passive components such as resistors, capacitors, inductors, diodes, etc. This signal receiver 118 can also comprise a device configured to receive the electromagnetic radiation, acoustic, optical, or ultrasonic signal, such as an antenna, or microphone, or other type of transducer that can receive a signal. The electrical interconnection between the receiver 118, the valve assembly 106, and the power source 108 can be wires. These wires can be of the stranded or solid type. The valve assembly 106 can be of the solenoid type which will remain closed until it is energized, and will open when the correct power is applied to it. The valve assembly 106 can further be of the screw valve type, taper valve type, and the like that can accommodate a variable amount of flow in response to a signal.

With further reference to FIG. 1, a remote controller 120 for controlling the system 100 can have a button 122 which can be connected to power source 126 and transmitter circuit 124. Power source 126 can be a battery of the disposable or rechargeable type, or solar panel, or other type of power source. A user can activate the button 122, thereby connecting the power source 126 to the transmitter circuit 124, which can now be energized and can transmit a signal. This signal can be received by the receiver 118. When the user stops activation (i.e. stops pushing the button) of button 122, the power source 126 can be disconnected from transmitter circuit 124, which can then stop transmitting a signal to receiver 118. When the receiver 118 detects the absence of the appropriate signal, it can close the valve 106 which will stop the flow of material from the manifold 104 through the valve 106. The button 122 can be a toggle switch, foot switch, voice activated switch, or the like. The button 122 or like device can also be configured to open the valve 106 at intermediate levels between open and closed to get the desired amount of flow of material from the nozzle 112. For example if an operator "clicks" the button 122 twice in quick succession, it can correlate to the valve 106 opening halfway, etc. Additionally the button 122 can consist of a set of buttons, or a dial, or sliding switch, or the like, such that the flow can be controlled to the desired amount.

With continued reference to FIG. 1, according to one embodiment, the receiver 118 and remote controller 120 can further comprise a two-way communication system wherein both the receiver 118 and remote controller 120 can be configured to both send and receive signals. The signal receiver 118 can be a transceiver that can be in serial connection with sensors to measure data and performance. For example, the material delivery system 100 can include a low battery sensor and indicator, a material level sensor and indicator, a material pressure sensor and indicator, a flow meter, or a combination of any or all of these. The manifold 104 can have a display that can indicate the status of the battery, fluid levels, flow rate, and/or pressure in the canister. Additionally, or in the alternative, the receiver 118 can transmit to the remote controller 120 the status of the battery, fluid levels, flow rate, and/or pressure in the canister 102. In turn, the remote controller 120 can notify the operator of these statuses via visual signal, audible signal, vibration, or any other type of notification or a combination of any or all of these. According to one embodiment, the notification can be in the form of a single or multiple LED signals on the remote controller 120 that can be illuminated to display one or more of these status to the operator.

Figure 2:
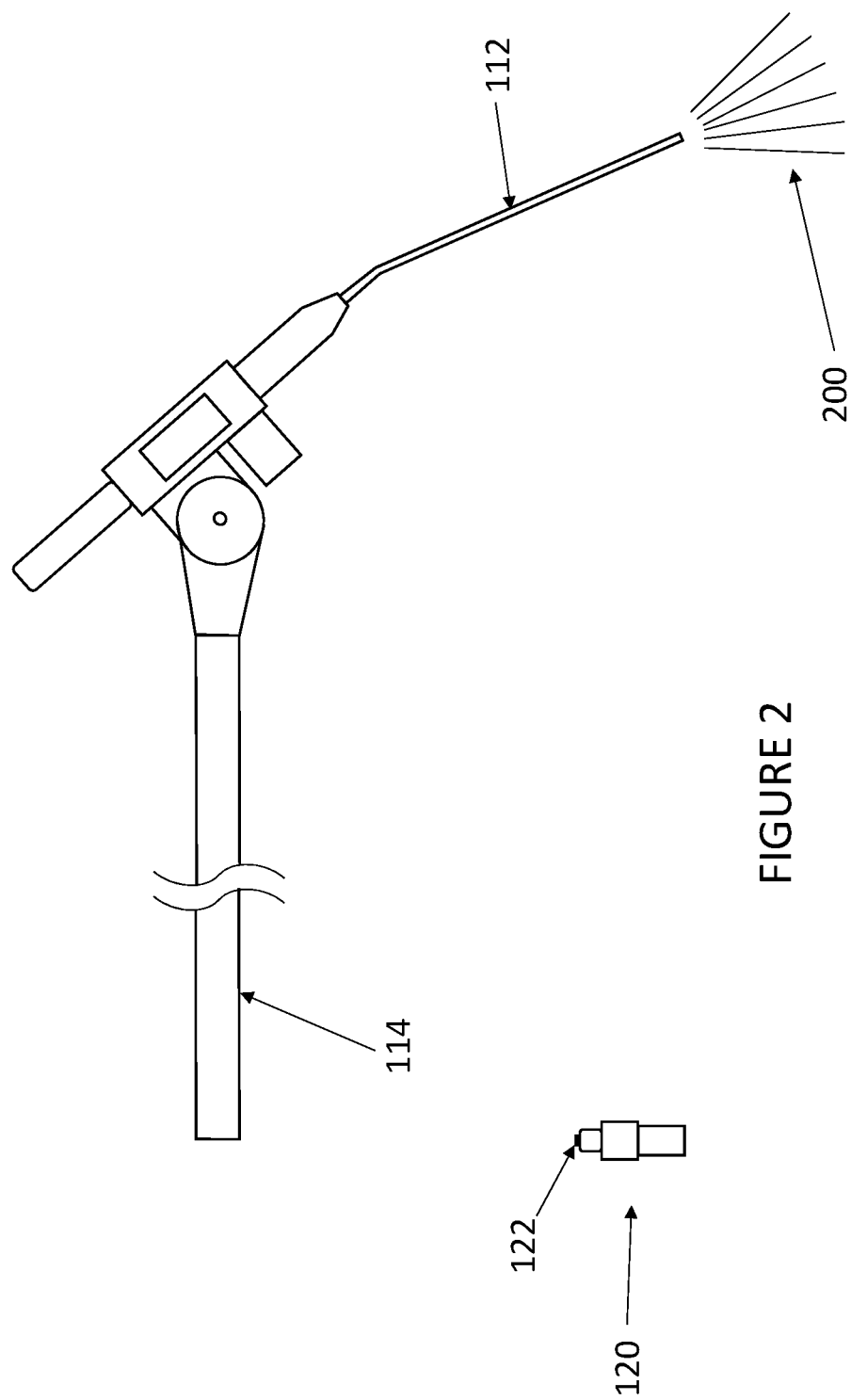
FIG. 2 is an exemplary use of a remotely controlled material delivery system.

With reference to FIG. 2, according to this embodiment, when a user activates the button 122 on the remote controller 120, this can result in an emission of material 200 from nozzle 112. This material 200 can be of a variety of types that are used in the field of lubrication of electrical switchgear or any other material suitable for specific applications. Typical lubrication compounds that are used can include mineral oils, solvents, and synthetic lubricants that can include silicon based fluids, polyalphaolefins (PAO), ester oils, and fluorosilicone. In addition to these materials, a specially-formulated di-ester oil lubricant can be used. The material 200 can further generally consist of any type of fluidic material including paint, solvents, penetrating oils, insecticide, cleaning solutions, water, and the like. It can also include gases such as CO2, Nitrogen, or even flammable gases such as propane or methane. Additionally, the nozzle 112 can provide a spray pattern, or a direct stream, or possibly a drip of material. The nozzle 112 can be constructed of either metal, plastic, or the like, as appropriate for the material to be dispersed. The nozzle 112 can also be configured to have a "quick-connect" type of fitting, as typically found on pressure washers, so that different nozzles can easily and quickly be attached to the valve 106.

With reference to FIG. 2, according to this embodiment, a user of the system can hold the hot stick 114 or other extension device with two hands, and can hold the remote controller 120 in one of his/her hands simultaneously. This can enable a person to move the system into the proper location with the extension, press the button 122, and apply the material 200. The remote controller 120 can also be attached to the extension or hot stick for more convenient operation. The user can be electrically isolated from the electrical equipment both by the insulating nature of the hot stick 114, as well as the system being wireless and not providing a path for the voltage to arc to the user. Additionally, the button 122 for the remote controller 120 can be a foot switch, enabling the operator to use two hands, or it can be voice activated, or it can be a toggle switch. In the case where the system 100 is used in conjunction with a flying or ground-based remote controlled drone, the controller 120 can functionally be incorporated into a remote controller for the drone, such that a user can operate the system 100 via using only the drone controller.

Another embodiment of the material delivery system 100 can include a tube or hose in place of the canister 102, which can provide a material to the manifold 104 in a like fashion as the canister 102, and can allow a prolonged operation of the system 100 without having to replace the canister 102. This can be useful in applications that are not related to high voltage electrical switching equipment such as painting, cleaning, firefighting and the like.

According to one embodiment of the material delivery system 100 can include a camera mounted on the manifold 104. According to this embodiment, the receiver 118 and remoted controller 120 can be in two-way communication such that an audio visual signal can be transmitted from the camera via the receiver 118 to the remote controller 120. According to this embodiment, the remote controller 120 can include a display screen such as an LCD, LED, AMO-LED, or any other suitable display screen. Alternatively, the remote controller can include a port, such as USB, HDMI, DVI, VGA, Composite, Component, or another suitable port for connecting the remote controller 120 to a display screen. According to another embodiment, the remote controller 120 can communicate with a display screen wirelessly. According to another embodiment, the camera can include a wired or wireless transmitter that can communicate directly with a display screen, which can be separate or integrated into the remote controller 120.

According to one embodiment, the camera mounted on the manifold 104 of the material delivery system 100 can be controlled separate from the remote controller 120. By way of a non-limiting example, the camera can be in two-way communication with a separate controller such that an audio visual signal can be transmitted from the camera to the separate controller via a wired or a wireless connection. According to one embodiment, the separate controller can be a smart phone, a tablet, a smart watch, or a similar device that includes a display screen to allow a user to control the camera and remotely view what the camera is recording. According to this embodiment, the hot stick 114, other extension device, or drone controller can include a holder or mounting bracket configured to hold the separate controller. One example could be a smart phone holder disposed on the end of the hot stick 114 near the user's hand which would allow the user to view and control the camera separate from the material delivery system 100 while maintaining control over the hot stick 114 and/or the material delivery system 100.

Another embodiment of the material delivery system 100 can include more than one canister 102 to be attached to the manifold 104, wherein each canister 102 can contain a specific material, such as separate colors of paint or cleaning solutions, which can subsequently be combined in the manifold 104, and passed through the valve 106 and out through the nozzle 112. Additionally, one canister 102 may contain a material and the other canister 102 may contain a pressurized gas such as $CO_2$, which can be used as a propellant, or other gases that can react in an intended way with the material.

According to another embodiment of the material delivery system 100, at least one additional valve 106 can be added to the manifold 104 to control the flow of material into the manifold 104, or to control material flowing out of the manifold 104.

Another embodiment of the material delivery system 100 can include the tube or hose in place of the canister 102 or in combination with at least one additional canister 102 so that the material provided by the hose or tube can be combined with the material in the attached canister 102 in the manifold 104. The material provided by the hose or tube could also act as a propellant, such as compressed air or water under pressure. This could be useful, for example, in the application of water based paints, insecticides, cleaning solutions, etc. that require a mixture of a concentrated material with water. This and other embodiments of the system 100 can have an environmental enclosure to protect it from the spray of material, water, or from rain or other potential environmental contaminants.

The remotely controlled material delivery system 100 can be used on electrical distribution equipment such as switchgear, transformers, capacitors, or the like. The utility of this apparatus lies in the safety and functionality provided by the remote control feature. Other embodiments as described above can take advantage of the features that extend its usefulness beyond that of lubrication of electrical distribution equipment.

As described above, the present disclosure has been described with preferred embodiments thereof and it is understood that many changes and modifications to the described embodiments can be carried out without departing from the scope and the spirit of the present disclosure that is intended to be limited only by the appended claims.

We claim:

1. A remotely controlled material delivery' system comprising: at least one canister, for containing a material to be dispensed; a nozzle, separate from the canister, having a first end and a second end; a manifold, separate from the canister, to direct movement of the material from the canister to the nozzle, wherein the manifold is filled with the material from the canister, wherein the material remains in the manifold until dispensed, wherein the manifold has a first attachment point and a second attachment point, wherein the canister is engaged with the first attachment point of the manifold, wherein when the canister is engaged with the manifold, the manifold is filled with material from the canister;

a valve mechanism, separate from the canister, to control the flow of material such that the material remains in the manifold until the valve mechanism is opened, thereby allowing the material to flow from the manifold through the valve mechanism and into the nozzle, and wherein when the valve mechanism closes, the material remains in the manifold, wherein the valve mechanism has a first attachment point and a second attachment point, wherein the first attachment point of the valve mechanism is engaged with the second attachment point of the manifold, wherein the second attachment point of the valve mechanism is engaged with the first end of the nozzle, wherein the valve mechanism controls the flow of material from the manifold through the nozzle;

a signal receiver, incorporated into the manifold, for receiving a signal that causes the valve mechanism to open, which releases the material contained in the manifold, which travels through the nozzle to be dispensed, a power source, incorporated into the manifold, for providing electric power to energize the valve mechanism to open upon receiving the signal;

a mounting adapter, incorporated into the manifold, and attaches to an adapter at a working end of a hot stick extension that provides access to locations out of physical reach; and a remote controller operable to generate the signal wherein the signal is transmitted from the remote controller to the signal receiver through a transmitter circuit, wherein the receiver can open and close the valve in response to the remotely generated signal.

2. The system of claim 1, wherein the mounting adapter is adapted to fit a paint roller extension.

3. The system of claim 1, wherein the nozzle is attached by a "quick-connect" fitting.

4. The system of claim 1 wherein the transmitter circuit on the remote controller is activated by a button, foot switch, toggle switch, voice activated switch, variable switch, or a plurality of switches.

5. The system of claim 1, wherein the valve can he controlled such that it can be fully opened, fully closed, or at intermediate levels between fully open and fully closed.

6. The system of claim 1, wherein the signal receiver comprises a transceiver operable to both transmit and receive a signal; the remote controller further comprises a transceiver that is operable to both transmit and receive a signal; the signal receiver and remote controller are configured to be in two-way communication with each other; and wherein the signal can be transmitted through a wired connection or wirelessly between the remote controller and the signal receiver.

7. A remotely controlled material delivery system comprising: at least one canister, for containing a material to be dispensed; a nozzle, separate from the canister, having a first end and a second end; a manifold, separate from the canister, to direct movement of the material from the canister to the nozzle, wherein the manifold is filled with the material from the canister, wherein the material remains in the manifold until dispensed, wherein the manifold has a first attachment point, and a second attachment point, wherein the canister is engaged with the first end of the manifold, wherein when the canister is engaged with the manifold, the manifold is filled with material from the canister;

a valve mechanism, separate from the canister, to control the flow of material such that the material remains in the manifold until the valve mechanism is opened, thereby allowing the material to flow from the manifold through the valve mechanism and into the nozzle, and wherein when the valve mechanism closes, the material remains in the manifold, wherein the valve mechanism has a first attachment point and a second attachment point, wherein the first attachment point of the valve mechanism is engaged with the second attachment point of the manifold and wherein the second attachment point of the valve mechanism is engaged to the first end of the nozzle, wherein the valve mechanism controls the flow of material from the manifold, a signal receiver, incorporated into the manifold, for receiving a signal that causes the valve mechanism to open, which releases the material contained in the manifold, which travels through the nozzle to be dispensed, a power source, incorporated into the manifold, for providing electric power to energize the valve mechanism to open upon receiving the signal;

a camera disposed on the manifold wherein the camera is selectively operable to take still frame photographs and record video;

a mounting adapter, incorporated into the manifold, and attaches to an adapter at a working end of a hot stick extension that provides access to locations out of physical reach, and a remote controller operable to generate the signal wherein the signal is transmitted from the remote controller to the signal receiver through a transmitter circuit, wherein the receiver can open and close the valve in response to the remotely generated signal, and wherein the signal is transmitted through a wireless connection or through an optical connection from the remote controller to the signal receiver.

8. The system of claim 7, wherein the signal receiver comprises a transceiver operable to both transmit and receive a signal; the remote controller further comprises a transceiver that is operable to both transmit and receive a signal; the signal receiver and remote controller are configured to be in two-way communication with each other; and wherein the signal can be transmitted through a wired connection or wirelessly between the remote controller and the signal receiver.

9. The system of claim 7, wherein the camera further comprises:

a transmitter operable to both transmit and receive a signal.

10. The system of claim 9 further comprising:

a camera controller operable to both transmit and receive a signal;

wherein the camera and camera controller are configured to be in two-way communication with each other; and wherein the signal can be transmitted through a wired connection or wirelessly between the camera and the camera controller.

11. The system of claim 10, wherein the camera controller is remote from the camera and is integrated into the remote controller of the material delivery system.

12. The system of claim 10, wherein the camera controller is remote from the camera and further comprises a separate device from the remote controller of the material delivery system.

13. The system of claim 12, wherein the camera controller further comprises a smart phone, smart watch, or a tablet.

* * * * *